United States Patent [19]
Saka et al.

[11] Patent Number: 5,653,607
[45] Date of Patent: Aug. 5, 1997

[54] ELECTRIC CONNECTION CASING

[75] Inventors: Yuuji Saka; Nori Inoue; Takahiro Onizuka; Yoshito Oka; Makoto Kobayashi; Hisashi Kounoya, all of Yokkaichi, Japan

[73] Assignee: Sumitomo Wiring Systems, Ltd., Yokkaichi, Japan

[21] Appl. No.: 506,634

[22] Filed: Jul. 25, 1995

[30] Foreign Application Priority Data

| Jul. 27, 1994 | [JP] | Japan | 6-175762 |
| Dec. 22, 1994 | [JP] | Japan | 6-320400 |
| Dec. 27, 1994 | [JP] | Japan | 6-325240 |

[51] Int. Cl.⁶ ................................. H01R 4/24
[52] U.S. Cl. .................... 439/402; 439/76.2; 439/44
[58] Field of Search ...................... 439/76.2, 78, 402, 439/404, 43, 44, 52, 85, 94, 507, 701, 714, 717, 721

[56] References Cited

U.S. PATENT DOCUMENTS

| 5,057,026 | 10/1991 | Sawai et al. | 439/76.2 |
| 5,125,846 | 6/1992 | Sampson et al. | 439/404 X |
| 5,156,557 | 10/1992 | Okafuji et al. | 439/404 |
| 5,207,587 | 5/1993 | Hamill et al. | |
| 5,295,842 | 3/1994 | Ozaki et al. | 439/76.2 |
| 5,295,858 | 3/1994 | Kasai et al. | |
| 5,362,242 | 11/1994 | Nakamura | |
| 5,501,605 | 3/1996 | Ozaki et al. | 439/404 X |

FOREIGN PATENT DOCUMENTS

| 2136989 | 11/1989 | Japan |
| 1166419 | 11/1990 | Japan |

OTHER PUBLICATIONS

Japanese Laid Open Utility Model Publication No. 1-166419.
Japanese Laid Open Utility Model Publication No. 2-136989.

*Primary Examiner*—Khiem Nguyen
*Attorney, Agent, or Firm*—Greenblum & Bernstein P.L.C.

[57] ABSTRACT

An electric connection casing comprising a large intensity-current circuit through electric current having a large intensity flows; a small intensity-current circuit through electric current having a small intensity flows; and a fuse and a relay interposed between the large intensity-current circuit and the small intensity-current circuit, wherein the large intensity-current circuit and the small intensity-current circuit comprise a plurality of single core wires, respectively; and a plurality of pressure-contact terminals which penetrates through an insulation coating of the single core wire, thus being connected with the single core wire by pressing the pressure-contact terminal against the single core wire.

10 Claims, 10 Drawing Sheets

ELECTRIC CONNECTION CASING

BACKGROUND OF THE INVENTION

1. Field of the Invention

The present invention relates to an electric connection casing for use in a car, and more particularly, to an electric connection casing comprising electric circuits, a plurality of relays, fuses, and the like. The electric connection casing is used to perform the branch-connection of a wire harness and an internal circuit thereof comprises electric wires and connection terminals connected with the electric wires under pressure.

2. Description of the Prior Art

Heretofore, the internal circuit of the electric connection casing comprised a bus bar processed by punching a conductive metal plate into a predetermined configuration.

The internal circuit composed of only the bus bar makes it difficult to alter the design thereof. In order to solve this problem, an electric connection casing was proposed and disclosed in Japanese Laid-Open Utility Model Publications Nos. 1-166419 and 2-136989. In this electric connection casing, a circuit comprising electric wires and connection terminals connected therewith under pressure is used as a small intensity-current circuit, which is easy to be design-altered and connected with load electrical components and the bus bar is used as a large intensity-current circuit connected with a power source.

In the electric connection casing comprising the large intensity-current circuit composed of the bus bar and the small intensity-current circuit comprising electric wires and the pressure-contact terminals, it is necessary to accommodate the two circuits having different constructions in one electric connection casing. Thus, the internal construction of the electric connection casing is complicated, and in addition, many kinds of constituent parts are required and moreover, the assembling process is increased because the large intensity-current circuit and the small intensity-current circuit are installed in the electric connection casing in different manners.

Further, the electric connection casing is manufactured at a high cost, because both a punching die mold for forming the bus bar and a wiring die mold for wiring electric wires are required.

In addition, if the large intensity-current circuit connected with the power source is used as parts of other types of cars, it is frequently necessary to alter the design thereof. In this case, it is necessary to alter the construction of the bus bar. Thus, even though only the small-current circuit to be connected with the load electrical components is composed of electric wires and pressure-contact terminals, problems which occur when the large intensity-current circuit is composed of the bus bar cannot be solved.

Figure 12:
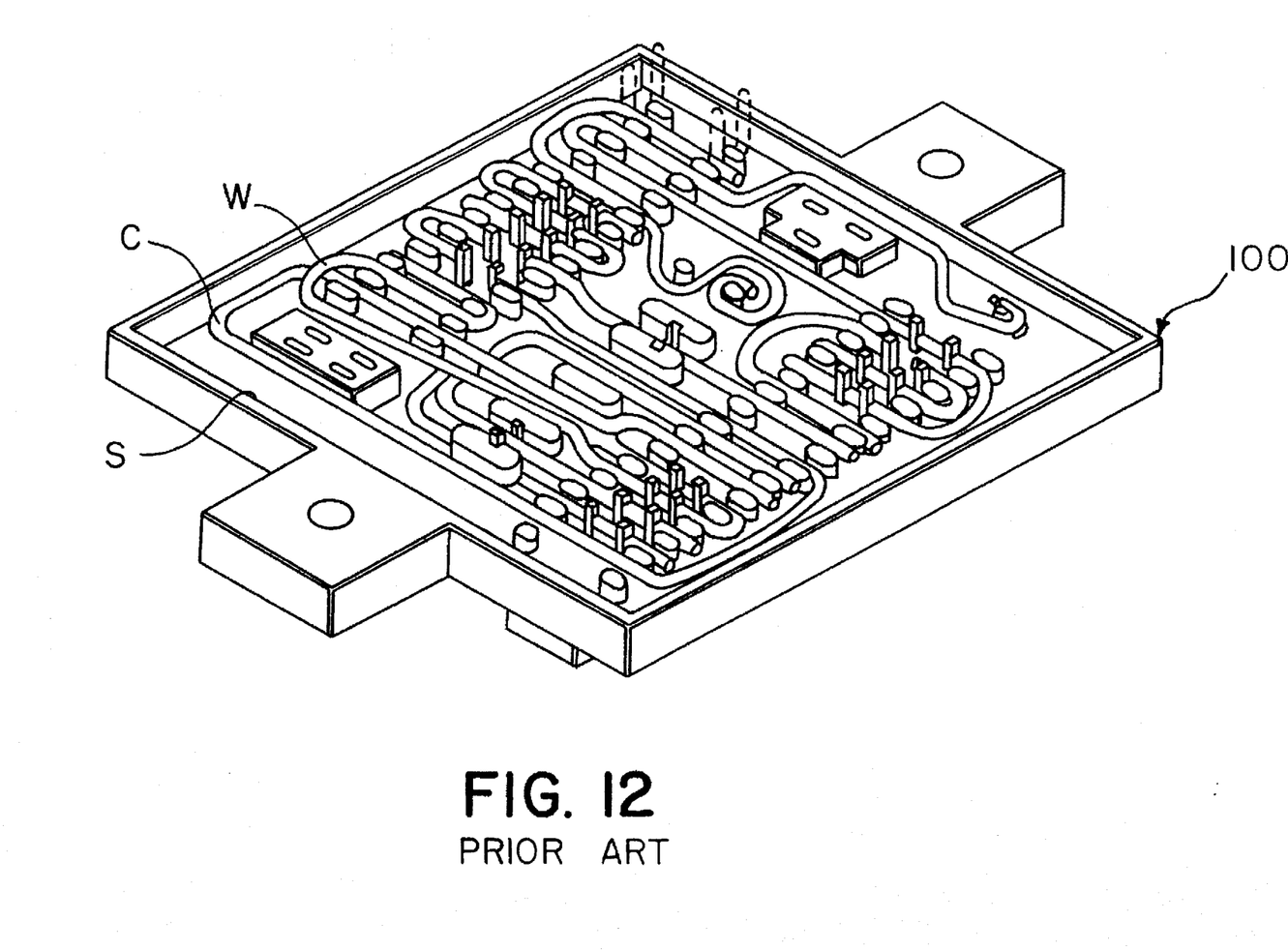
FIG. 12 is a perspective view showing a conventional electric connection casing accommodating wired electric wires.

Heretofore, electric wires were wired in an upper case, a lower case or an insulation plate of the electric connection casing in advance and then, pressure-contact terminals were fixed to the electric wires under pressure. As shown in FIG. 12, the electric wires W to be wired inside the electric connection casing 100 comprise straight portions S and curved portions C.

In wiring the electric wires as described above, the straight portions S can be wired easily but there is a possibility that the curved portions C cannot be easily bent and hence cannot be wired. In this case, it is necessary to bend the electric wires W at large angles or wire the electric wires without bending them. Thus, the electric connection casing has a low degree of freedom in design.

Further, electric wires interfered with each other. As a result, the electric wires cannot be wired.

SUMMARY OF THE INVENTION

The present invention has been developed with a view to substantially solving the above described disadvantages, and it is a first object of the present invention to provide a electric connection casing in which a large intensity-current circuit for connecting with a power source is composed of electric and pressure-contact terminals to compose all internal circuits of electric wires and pressure-contact terminals so that an electric current having a large intensity can be allowed to flow through the large intensity-current circuit composed of electric wires and connection terminals.

It is a second object to solve the problem at a portion of an electric wire to be bent and the problem that electric wires cannot be wired due to interference between them.

In order to achieve the aforementioned object, an electric connection casing according to the present invention comprises a large intensity-current circuit through which an electric current having a large value flows; a small intensity-current circuit through which an electric current having a small value flows; and a fuse and/or a relay interposed between the large intensity-current circuit and the small intensity-current circuit. In this construction, the large intensity-current circuit and the small intensity-current circuit comprise a plurality of single core wire, respectively; and a plurality of pressure-contact terminals which penetrate through an insulation coating of each single core wire, thus being connected with each single core wire by pressing the pressure-contact terminal against each single core wire.

As described above, an internal circuit of the electric connection casing is composed of electric wires comprising single core wire and the pressure-contact terminals to be connected therewith by pressing terminals against wires. When the pressure-contact terminal is pressed against the electric wire, the pressure-contact terminal is connected with the core of the single core wire, thus allowing the area of the contact between the pressure-contact terminal and the core to be constant and further, preventing the resistance value from becoming high because current intensity is not reduced at the portion of the contact between the pressure-contact terminal and the core. Generally, an electric wire through which electric current having a large intensity flows comprises a core wire made of strand wire. Such an electric wire is incapable of keeping the area of the contact between the pressure-contact terminal and the core constant when the pressure-contact terminal is pressed against it, whereas the electric wire according to the present invention allows the area of the contact between the pressure-contact terminal and the core to be constant because the electric wire comprises the single core wire. Accordingly, the electric wire allows electric current having a great intensity to flow through the large intensity-current circuit.

The single core wire of the large intensity-current circuit has a large diameter, whereas the single core wire of the small intensity-current circuit has a small diameter.

As described above, the single core wire of the large intensity-current circuit has a large diameter. Thus, the electric wire of the large intensity-current circuit allows electric current having a great intensity to flow therethrough. That is, electric current can be allowed to flow through the electric wire of the large intensity-current circuit at an appropriate intensity. Similarly, the single core wire of the small intensity-current circuit has a small diameter. Therefore, electric current can be allowed to flow through the electric wire of the small intensity-current circuit at an appropriate intensity.

The pressure-contact terminal comprises a slot portion having a cutting edge, to be pressed against each single core wire, formed on an inner peripheral surface thereof; and an input/output terminal to be connected with an external circuit. The input/output terminal is connected ed with a terminal of a connector accommodated in the electric connection casing so as to connect the input/output terminal with the external circuit.

In the electric connection casing of the present invention, the large intensity-current circuit may be composed by combining a plurality of thin electric wires with each other; the pressure-contact terminal may have a plurality of slot portions defined on one side thereof as portions to be pressed against the thin electric wires and an input/output terminal formed on the other side thereof; and the pressure-contact terminal may be connected with the thin electric wires by pressing against the thin electric wires so as to compose the large intensity-current circuit.

In the above construction, preferably, the pressure-contact terminal has a plurality of slot portions defined on one side thereof as contact-pressure portions to be pressed against electric wires and an input/output terminal formed on the other side thereof; the pressure-contact terminal is connected with the electric wires by pressing the pressure-contact against the electric wires; and one of the electric wires is used as a means for releasing heat.

Because the pressure-contact terminal has a plurality of slot portions, instead of the thick electric wire to compose the large intensity-current circuit, a plurality of thin electric wires to compose the small intensity-current circuit can be separately connected with the contact-pressure portions.

This construction allows the large intensity-current circuit to be composed of the thin electric wires. Thus, the electric wires can be wired easily, and the degree of freedom can be improved while wiring them.

The large intensity-current circuit comprising the thin electric wires eliminates the need for the thick electric wire and the pressure-contact terminal for connecting the thick electric wires thereto. Thus, a wiring equipment and an equipment for connecting the pressure-contact terminal with the thin electric wires under pressure can be allowed to have a simple construction and in addition, the electric connection casing can be composed of a small number of parts.

Because the heat release-electric wire is connected with one of the contact-pressure portions of the pressure-contact terminal, heat generated at the contact-pressure portions can be released therefrom through the heat release-electric wire.

Preferably, the electric wires composing the large intensity-current circuit and the small intensity-current circuit are cut to pieces at a desired portion in the electric connection casing so as to connect the pieces with each other by means of the pressure-contact terminal.

In the above construction, the electric wires are cut to pieces at a portion to be bent so as to connect the pieces with each other by means of the pressure-contact terminal.

The pressure-contact terminal is formed of a conductive metal plate; and a plurality of slot portions project from a connection portion, of the pressure-contact terminal, which has a required configuration so that the slot portions cut an insulation film of the electric wire and is connected with a single core wire of the electric wire.

In addition, a plurality of pins project from the connection portion, of the pressure-contact terminal, which has a required configuration so that the pins penetrate through an insulation coating of the electric wire and contact the core of the electric wire, and are connected with the electric wire.

As described above, an electrical connection of a wired electric wire formed by connecting a plurality of electric wires with each other by means of the pressure-contact terminal is similar to that of a wired single electric wire. The desired portion means a portion of an electric wire which cannot be bent at a desired angle. Because separated pieces of the electric wire are connected with each other by the pressure-contact terminal to allow an electrical connection between the separated pieces, the electric wire can be used as an internal circuit inside the electric connection casing.

The desired portion also means a portion which cannot be wired continuously, because electric wires adjacent to each other interfere with each other. In this case, a portion at which electric wires interfere with each other is cut to connect separated pieces with each other by means of the pressure-contact terminal.

The connection portion of the pressure-contact terminal is formed into the configuration corresponding to that of the end portions of each separated electric wire, and the slot or the pin projects from the connection portion in correspondence to the number of electric wires to be connected with each other and the positions of the electric wires. In this manner, the pressure-contact terminal securely connects the electric wires to each other.

Operation efficiency can be improved by connecting the pressure-contact terminal provided with an external input/output terminal and an electric wire with each other.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

An electric connection casing according to the present invention is described below with reference to the drawings.

Figure 1:
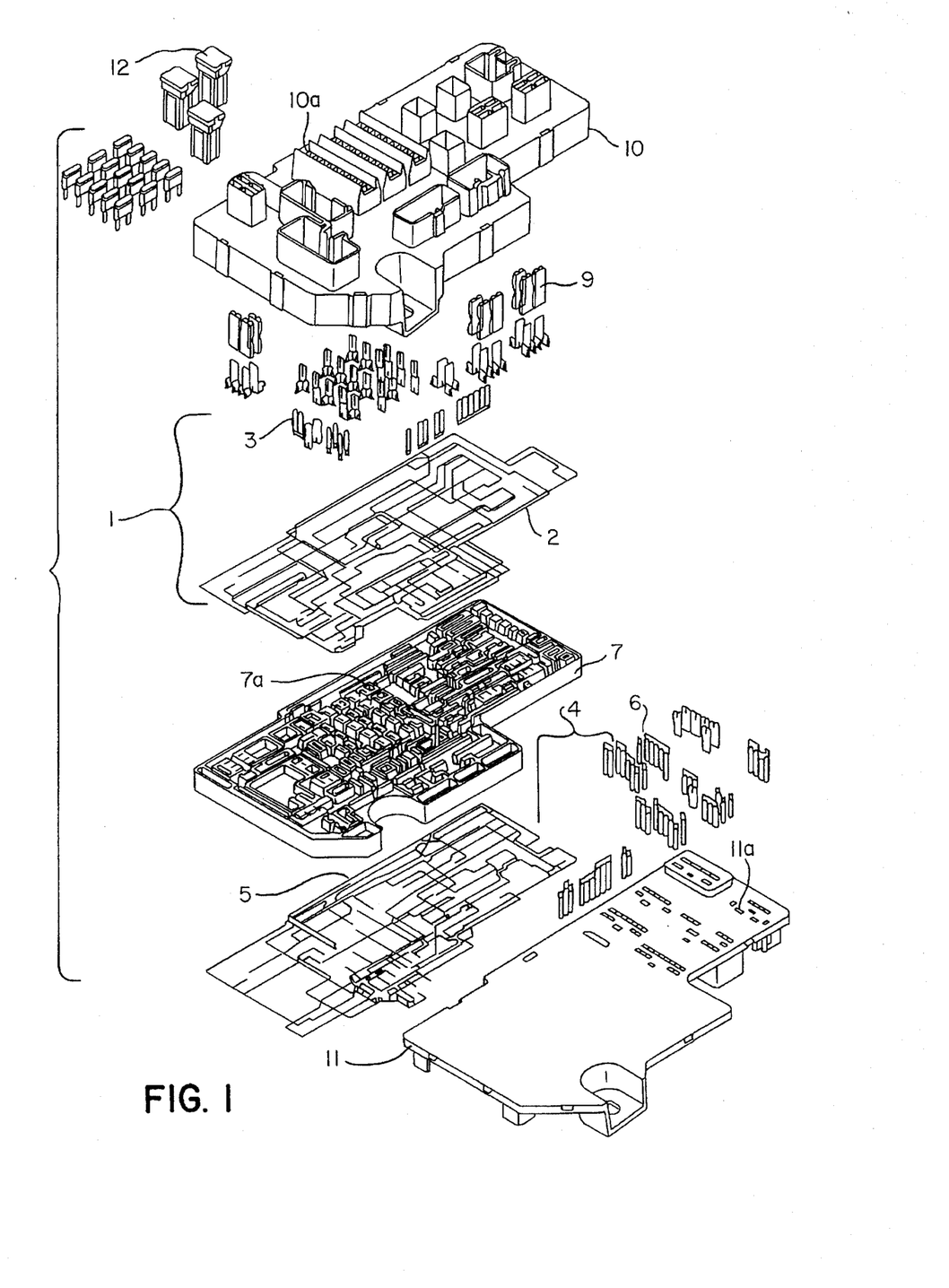
FIG. 1 is an exploded perspective view showing an electric connection casing according to a first embodiment of the present invention.

FIG. 1 is an exploded perspective view showing an electric connection casing according to a first embodiment of the present invention. A large intensity-current circuit 1 to be connected with a power source comprises a thick wire 2 having a large-diameter single core; and a pressure-contact terminal 3 to be pressed against the thick electric wire 2. A small intensity-current circuit 4 to be connected with a load electrical components comprises a thin wire 5 having a small-diameter single core; and a pressure-contact terminal 6 to be pressed against the thin electric wire 5.

The thick electric wire 2 of the large intensity-current circuit 1 is wired by inserting the thick electric wire 2 into a wide wiring groove 8 formed on the upper surface of an insulation plate 7, while the thin electric wire 5 of the small intensity-current circuit 4 is wired by inserting the thin electric wire 5 into a narrow wiring groove (not shown) formed on the lower surface of the insulation plate 7. The thick electric wire 2 and the thin electric wire 5 are wired on a wiring die (not shown), respectively and then, transferred from the wiring die to the insulation plate 7. That is, the thick electric wire 2 and the thin electric wire 5 are wired in advance, respectively..

After the thick electric wire 2 and the thin electric wire 5 are wired on the wiring groove 8 of the insulation plate 7, pressure-contact terminals 3 and 6 are pressed to predetermined positions on the wire 2 and 5. Thereby, as shown in FIGS. 2A and 2B, insulation coating 2a and 5a of each of the electric wires 2 and 5 are broken with slot portions 3a and 6a of each of the pressure-contact terminals 3 and 6 to bring the end surface of cutting edges 3b and 6b formed on the inner peripheral surface of each of the slot portions 3a and 6a into contact with single core wires 2b and 5b of each of the electric wires 2 and 5.

Figure 2A:
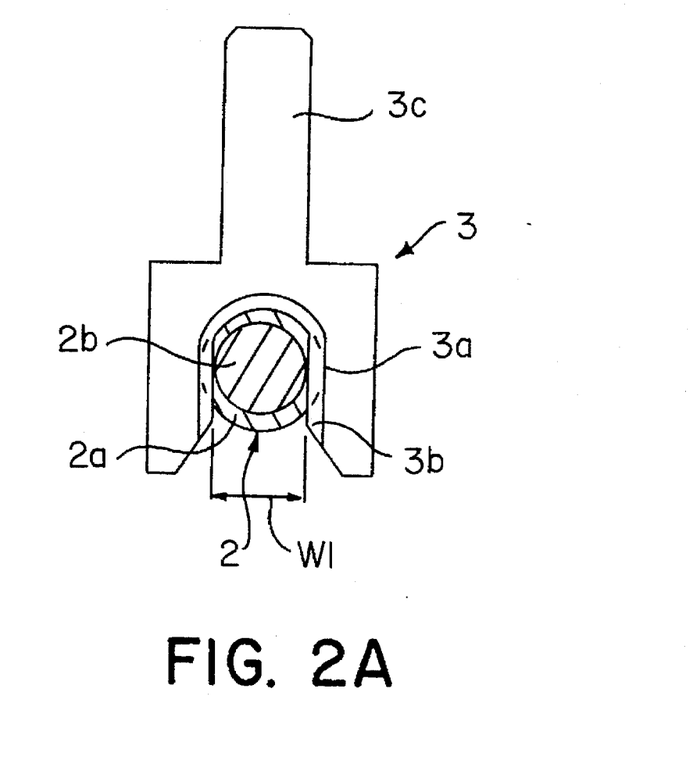
FIG. 2A is a sectional view showing an electric wire of a large intensity-current circuit and a pressure-contact terminal according to the first embodiment.
Figure 2B:
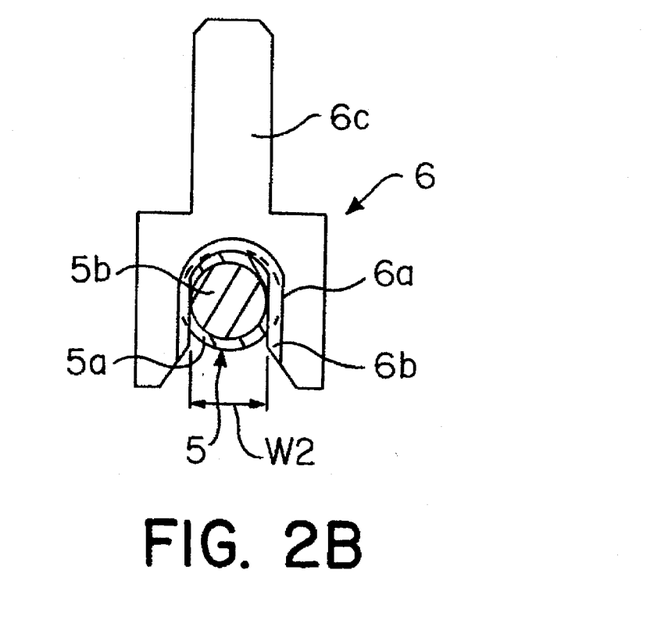
FIG. 2B is a sectional view showing an electric wire of a small intensity-current circuit and a pressure-contact terminal according to the first embodiment.

The diameter of the single core wire 2b of the thick electric wire 2 shown in FIG. 2A is great, and the sectional area of the single core wire 2b is set to be greater than 1.25 $mm^2$, while the diameter of the single core wire 5b of the thin electric wire 5 shown in FIG. 2B is small, and the sectional area of the single core wire 5b is set to be smaller than 1.25 $mm^2$. Therefore, the slot width W1 of the pressure-contact terminal 3 to be brought into contact with the thick electric wire 2 under pressure is set to be great, whereas the slot width W2 of the pressure-contact terminal 6 to be brought into contact with the thin electric wire 5 under pressure is set to be small to reliably bring the cutting edges 3b and 6b into contact with each of the core wires 2b and 5b in a constant area.

As described above, all internal circuits positioned in the connecting casing and comprising the large intensity-current 1 and the small intensity-current 4 are composed of the electric wire 2 and 5 and the pressure-contact terminals 3 and 6 brought into contact therewith under pressure.

Then, as necessary, a relay terminal 9 is connected with each of input/output terminals 3c and 6c composing the upper portion of each of the pressure-contact terminals 3 and 6. Then, an upper case 10 and a lower case 11 are assembled with insulation plate 7 interposed therebetween and with the input/output terminals 3c and 6c projecting from each of holes 10a and 11a formed on each of the upper case 10 and the lower case 11.

A fuse 12 and a connector (not shown) are mounted on the upper case 10 and the lower case 11, the input/output terminals 3c and 6c are projected from each connector to connect them with external terminals, and a terminal of each fuse 12 is inserted into the relay terminal 9 so as to connect the terminal of each fuse 12 with each of the pressure-contact terminals 3 and 6.

In the electric connection casing having the above-described construction, all internal circuits including the large intensity-current circuit and the small intensity-current circuit connected with the load electrical components are composed of electric wires and pressure-contact terminals. Thus, the designs of the internal circuits can be easily altered. Further, because the internal circuits do not comprise bus bars, it is unnecessary to use a bus bar-punching die and hence the electric connection casing can be manufactured at a low cost and in addition, can be used in various kinds of cars. Further, compared with the conventional electric connection casing comprising the bus bars, circuits are mounted on the electric connection casing in the same mounting method. Thus, the circuits can be mounted on the electric connection casing easily and the electric connection casing can be composed of a small number of parts.

Further, because the electric wire comprises a single core wire, it can be connected securely with the pressure-contact terminal.

Furthermore, because the electric wire of the large intensity-current circuit comprises the large-diameter single core wire, electric current having an appropriate intensity can be allowed to flow therethrough. Similarly, because the electric wire of the small intensity-current circuit comprises the small-diameter single core wire, electric current having an appropriate intensity can be allowed to flow therethrough as well.

FIGS. 3 through 6 show an electric connection casing according to a second embodiment of the present invention. A pressure-contact terminal 17A is formed by punching a conductive metal plate into a configuration as best shown in FIGS. 3 through 6 by using a press or the like.

There are provided, at the center of the pressure-contact terminal 17A and both sides thereof in the widthwise direction thereof, a plurality of pressure-contact portions 17b-1, 17b-2, and 17b-3 (three in the embodiment) each having a slot portion 17a to be brought into contact with a core wire of each of thin electric wires 18-1 through 18-3 (refer to FIG. 5) when insulation coatings thereof are broken.

A tab-shaped male terminal 17c projects upwardly from the center, of the upper end of the pressure-contact terminal 17A, in the widthwise direction thereof. The male terminal 17c may be a configuration of a female terminal.

Figure 5:
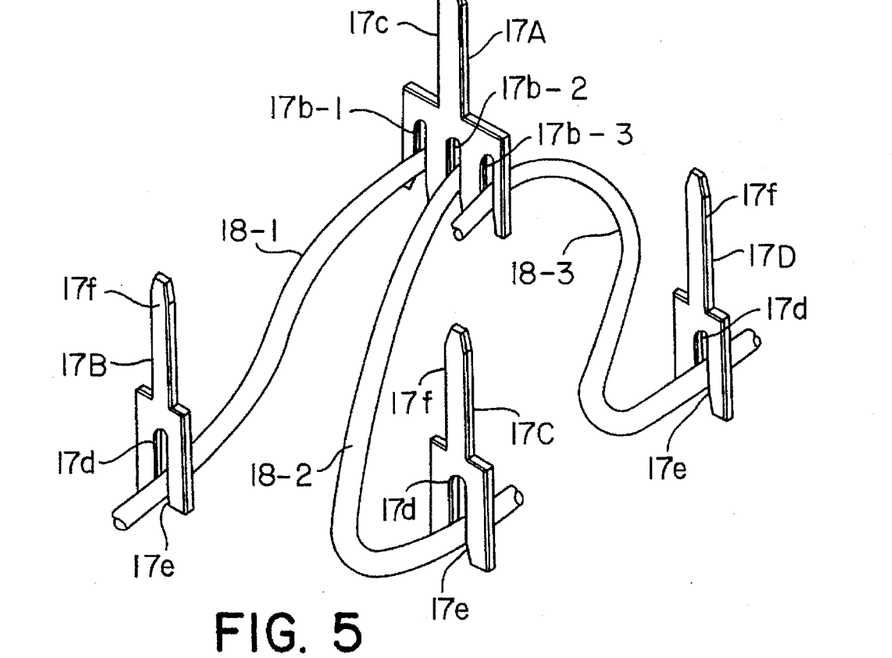
FIG. 5 is a perspective view showing an example the connection between the pressure-contact terminal and thin electric wires.

Pressure-contact terminals 17B, 17C, and 17D which are connected with each of the thin electric wires 18-1, 18-2, and 18-3 under pressure are also formed by punching a conductive metal plate into a configuration as shown in FIG. 5 by using a press or the like.

A tab-shaped male terminal 17f projects upwardly from the center of the upper end of each of the pressure-contact terminals 17B, 17C, and 17D in the widthwise direction thereof. The male terminal 17f may have a configuration of a female terminal.

Figure 4A:
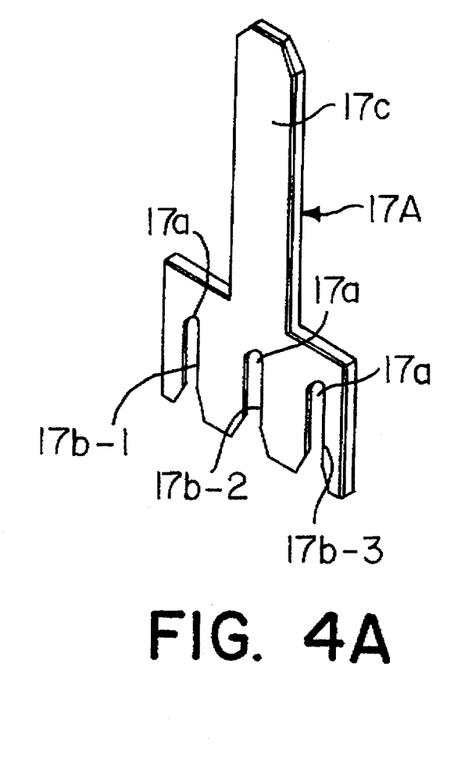
FIG. 4A is a perspective view showing a pressure-contact terminal to be used in the second embodiment.
Figure 4B:
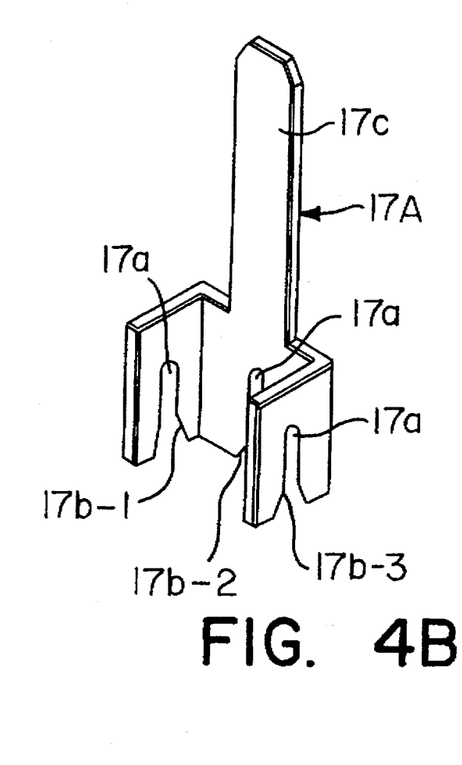
FIG. 4B is a perspective view showing a modification of the pressure-contact terminal of the second embodiment.

As shown in FIG. 4B, the pressure-contact terminal 17A may be U-shaped by bending both sides of the lower portion thereof. The number of the pressure-contact portions 17b of the pressure-contact terminal 17A may be two or more than three.

As shown in FIG. 5, the pressure-contact portions 17b-1, 17b-2, and 17b-3 of the pressure-contact terminal 17A are connected with one end of each of the thin electric wires 18-1, 18-2, and 18-3 under pressure.

The pressure-contact portion 17e of each of the pressure-contact terminals 17B, 17C, and 17D is connected with the other end of each of the thin electric wires 18-1, 18-2,-and 18-3 under pressure.

In this manner, the thin electric wires 18-1 through 18-3, which compose the small intensity-current circuit, are separately connected with each of the pressure-contact portions 17b-1 through 17b-3 of the pressure-contact terminal 17A under pressure.

The pressure-contact terminal 17A is used as the input terminal of the large intensity-current circuit, and the pressure-contact terminals 17B, 17C, and 17D are used as the output terminal of the small intensity-current circuit, with the thin electric wires 18-1 through 18-3 dividing electric current flowing through the pressure-contact terminal 17A.

The use of the thin electric wire instead of the thick electric wire makes it easy to bend electric wires, thus allowing them to be wired easily and increasing the degree of freedom to a great extent in wiring electric wires.

Further, the large intensity-current circuit comprising the thin electric wires eliminates the need for the thick electric wire and a pressure-contact terminal for connecting the thick electric wire thereto under pressure. That is, merely an equipment for wiring the thin electric wire and a thin electric wire-connecting terminal are required to compose the large intensity-current circuit. Therefore, an equipment for manufacturing the electric connection casing can be allowed to have a simple construction and in addition, the electric connection casing can be composed of a small number of parts.

There is a possibility that when heat is generated in the pressure-contact portions 17b-1 through 17b-3 of the pressure-contact terminal 17A due to contact resistance, creep of the cutting edge of the pressure-contact portions 17b-1 through 17b-3 is generated and hence, the performance of the cutting edge is deteriorated.

Figure 6:
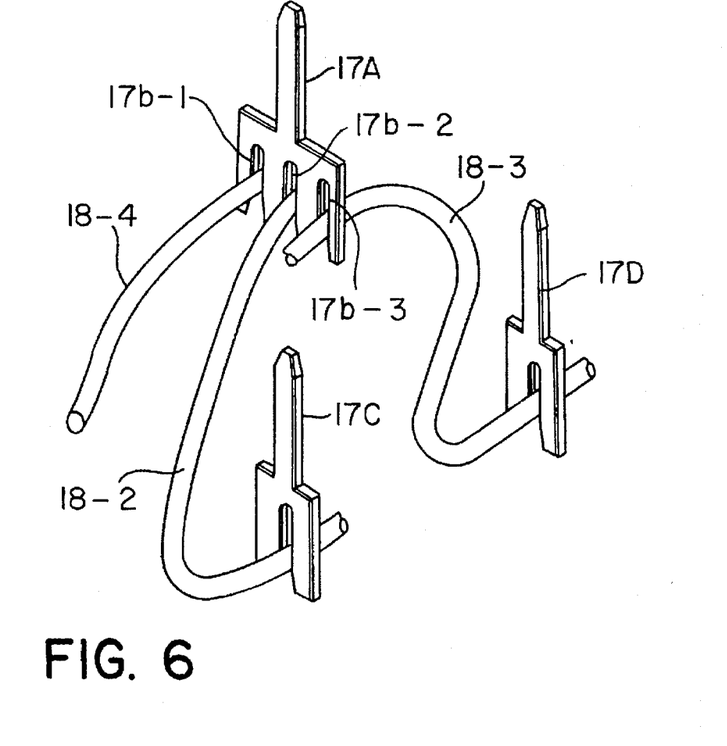
FIG. 6 is a perspective view showing an example of the connection between the pressure-contact terminal and a heat release-electric wire.

In order to prevent heat from being generated in the pressure-contact portions 17b-1 through 17b-3 as shown in FIG. 6, a heat release-electric wire 18-4 is connected with the pressure-contact portion 17b-1 under pressure, instead of the thin electric wire 18-1.

As shown in FIG. 6, one end of the heat release-electric wire 18-4 is connected with the pressure-contact terminal 17A under pressure and the other end thereof is not connected with the pressure-contact terminal 17B so as to release heat conducted through the core wire, of the heat release-electric wire 18-4, in contact with the pressure-contact terminal 17A from the other end thereof.

Figure 3:
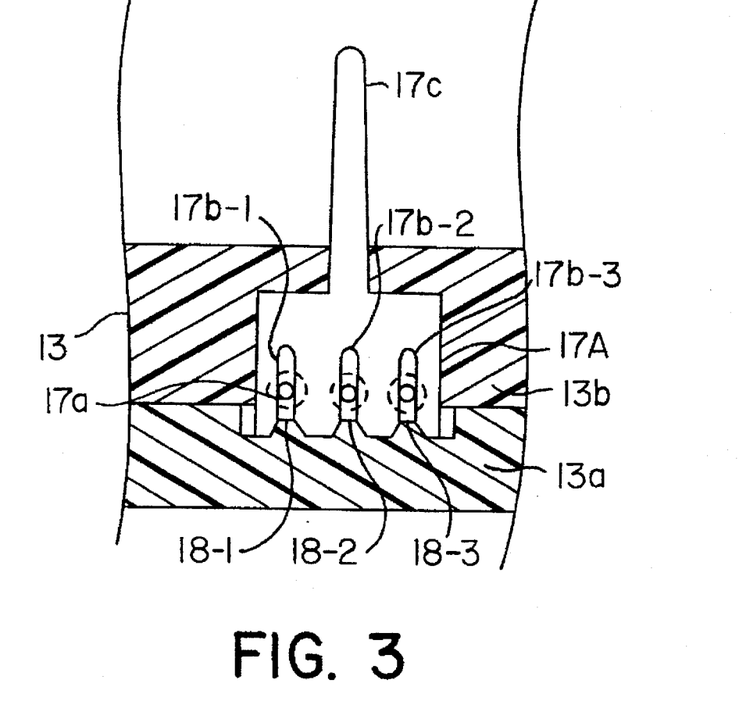
FIG. 3 is a sectional view showing an electric connection casing according to a second embodiment of the present invention.

As shown in FIG. 3, the thin electric wires 18-1 through 18-3 are wired in advance on a groove formed on a lower case 13a of a case 13. After the pressure-contact terminal 17A is mounted on the upper case 13b, the upper case 13b is mounted on the lower case 13a. As a result, the thin electric wires 18-1 through 18-3 are connected under pressure with each of the pressure-contact portions 17b-1 through 17b-3 of the pressure-contact terminal 17A.

Instead of wiring electric wires on the case 13, a wiring groove may be formed in advance on an insulation plate to be mounted inside the case 13 to wire the electric wires on the wiring groove, and then, contact-pressure terminals are mounted and pressed on the electric wires. Thereafter, the lower case and the upper case are mounted on the insulation plate on which the electric wires and the contact-pressure terminals have been mounted. In this manner, the electric connection casing is formed.

In the above-described construction, because a plurality of thin electric wires is separately connected under pressure with a plurality-of pressure-contact portions of the contact-pressure terminal, thin electric wires for electric current having a small intensity can be used instead of thick electric wires for electric current having a large intensity, thus allowing them to be bent easily and greatly improving the degree of freedom in wiring them. Further, the heat release-electric wire is connected with one of the pressure-contact portions of the contact-pressure terminal under pressure. Thus, heat generated in the contact-pressure terminal can be released through the heat release-electric wire, which prevents the contact-pressure terminal from being deteriorated.

FIGS. 7 through 11 show an electric connection casing according to a third embodiment of the present invention. In the third embodiment, electric wires are wired for connecting with terminals fixed to a lower case in advance. As shown in FIG. 7A, one electric wire W comprises straight portions S and a and a curved portion C.

Figure 7A:
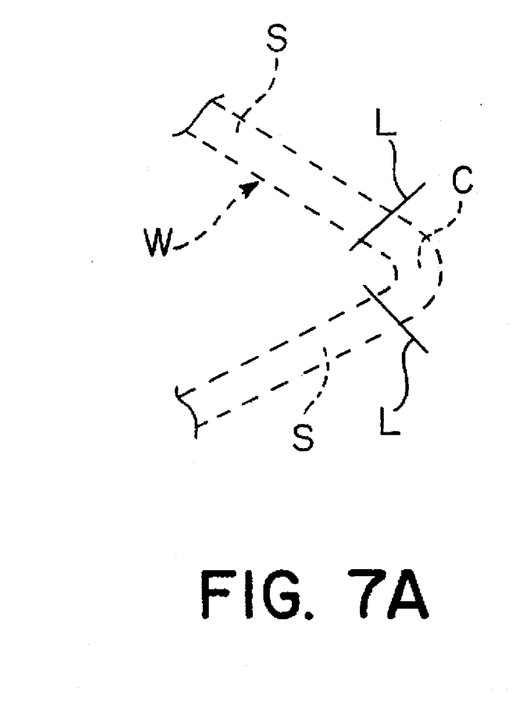
FIG. 7A is an imaginary diagrammatic view showing an ideal bending state of an electric wire.
Figure 7B:
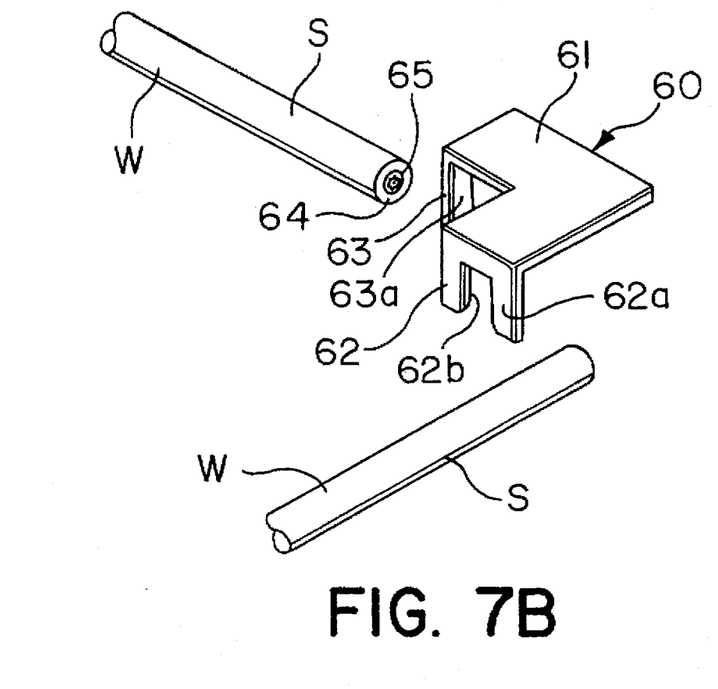
FIG. 7B is an exploded perspective view showing an electric connection casing, according to a third embodiment of the present invention, in which an electric wire is cut at a to-be-bent portion to connect its pieces formed by the cutting with each other with a connection terminal.

Let it be supposed that the electric wire W is required to be bent perpendicularly. FIG. 7A shows a state before the electric wire W is cut assuming that the electric wire W can be bent perpendicularly. If the electric wire electric wire W is so hard that it cannot be bent perpendicularly, it is cut at both ends of the curved portion C along a cutting line L shown in FIG. 7A to connect the straight portions S and S with each other by means of a connection terminal 60 of a pressure-contact type, as shown in FIG. 7B.

Figure 8A:
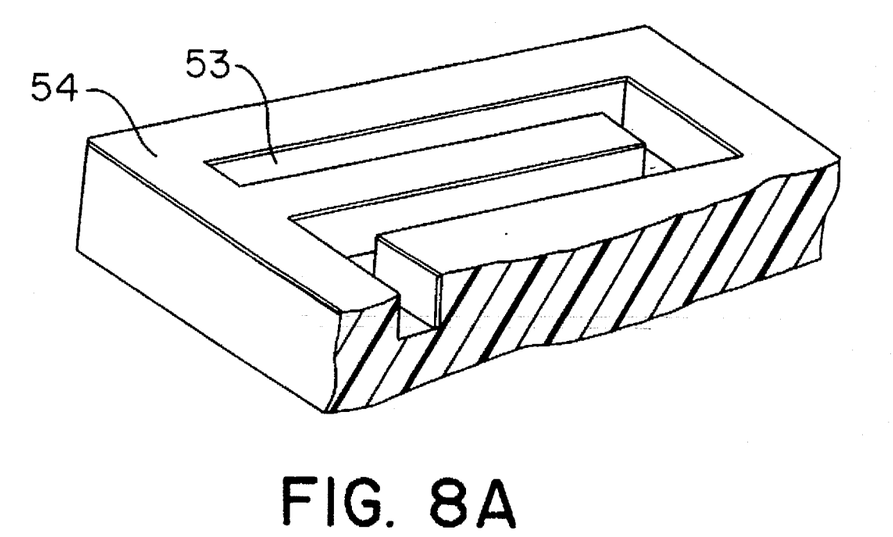
FIG. 8A is a perspective view showing a part of a wiring die.
Figure 8B:
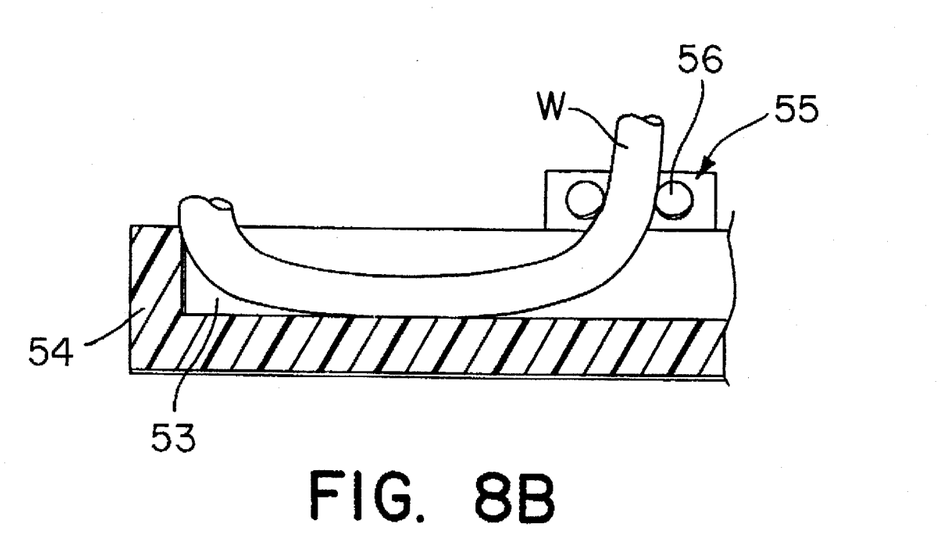
FIG. 8B is a schematic view showing a wired electric wire in the wiring die.

The electric wire W is wired by feeding it successively from a head roller 56 to a wiring die 54, as shown in FIG. 8, on which a wiring groove 53 has been formed, by means of an electric wire-feeding device 55. After the electric wire W is wired into the wiring groove 53, the lower case of the electric connection casing to which the pressure-contact terminal has been fixed is set on the wiring die 54, the electric wire W is connected with the pressure-contact terminal under pressure, and then, a push pin is projected from the bottom surface of the wiring die so as to press the lower case on which the terminal and the electric wire W have been installed from the wiring die 54.

In wiring the electric wire W on the wiring die 54, the electric-wire W is wired by cutting portions thereof which cannot be bent perpendicularly.

The electric wire W is also cut at a portion thereof which cannot be bent perpendicularly in wiring it by inserting it into a wiring groove formed on the lower case, the upper case or the insulation plate and then, fixing it by pressing the contact-pressure terminal downward against the electric wire W.

The pressure-contact terminal 60 for connecting the straight portions S and S of the electric wire W with each other at the point which can be bent perpendicularly is formed of a conductive metal plate. The pressure-contact terminal 60 comprises a connection portion 61 composed of an L-shaped flat plate bent perpendicularly in a horizontal direction; and slot portions 62 and 63 projecting downward from edges of the connection portion 61. The slot portions 62 and 63 comprise cutting edges 62a and 63a which contact a core wire 65 when an insulation coating 64 of the electric wire W is cut.

When the pressure-contact terminal 60 is pressed downward against a portion proximate to the cut portions of the electric wire W, the cutting edges 62a and 63a cut the insulation coating 64, thus contacting the core wire 65. In this manner, the straight portions S and S are connected with each other via the pressure-contact terminal 60.

Figure 9A:
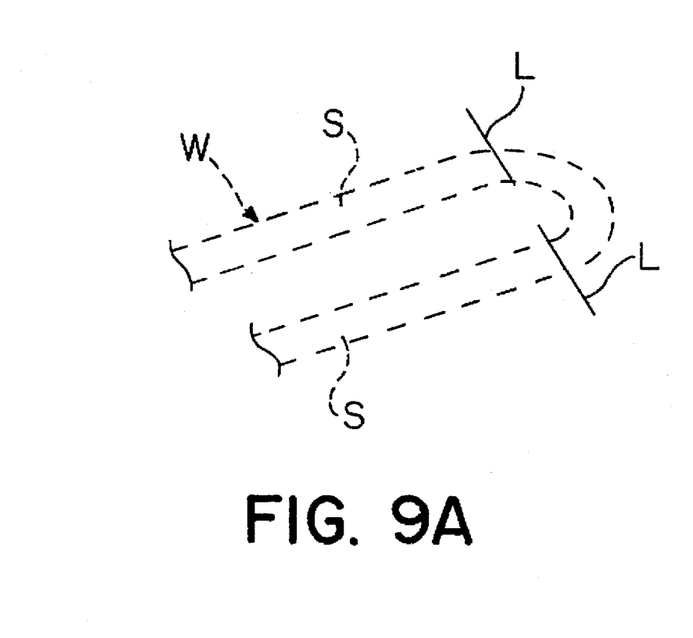
FIG. 9A is an imaginary diagrammatic view showing an ideal bending state of an electric wire;.
Figure 9B:
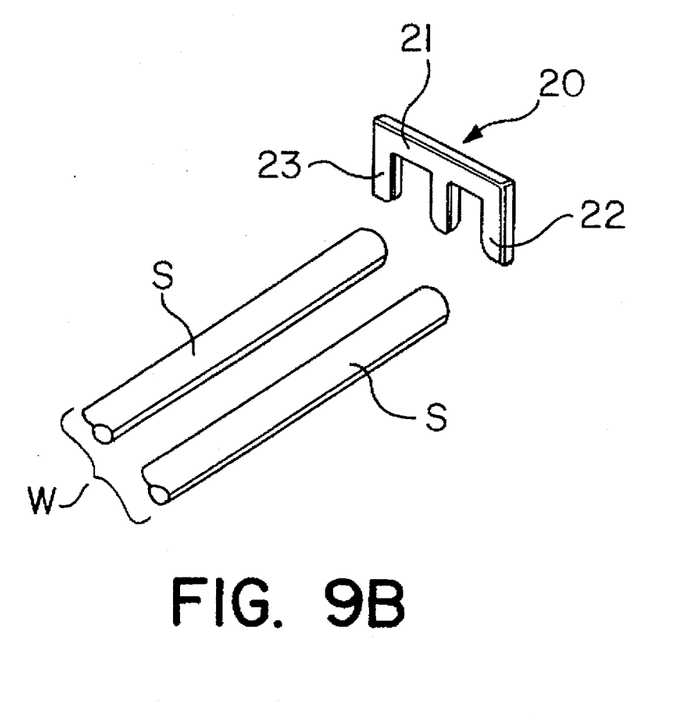
FIG. 9B is an exploded perspective view showing an electric connection casing, according to a fourth embodiment of the present invention, in which an electric wire is cut at a to-be-bent portion to connect its pieces formed by the cutting with each other with a connection terminal.

FIGS. 9A and 9B show a state in which the electric wire W is bent in the configuration of U. Because the electric wire W cannot be bent as shown by dotted lines of FIG. 9A, the electric wire W is cut along a line L and the straight portions S and S are arranged in parallel with each other, as shown in FIG. 9B.

The separated straight portions S and S of the electric wire W are connected with each other with a pressure-contact terminal 20. The pressure-contact terminal 20 made of a conductive metal plate which comprises a connection portion 21 positioned at the upper end thereof and two slot portions 22 and 23 positioned below the connection portion 21. The straight portions S and S of the wire W can be connected with each other by pressing the pressure-contact terminal 20 downward against a portion proximate to the leading end of each of the straight portions S and S.

Figure 10A:
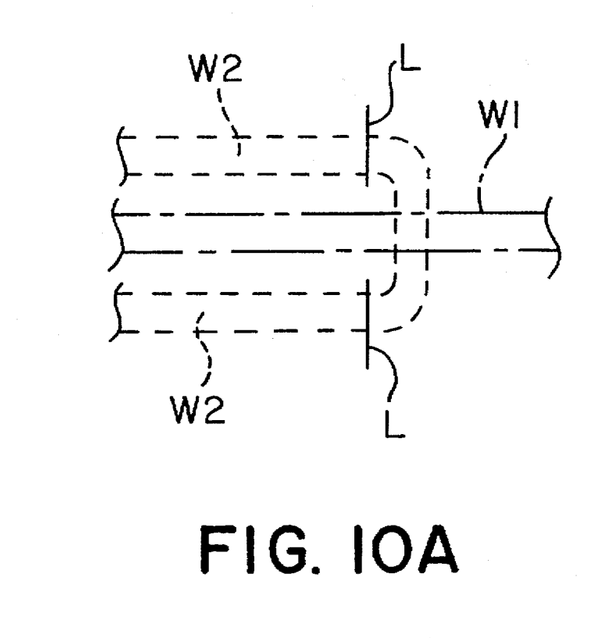
FIG. 10A is an imaginary diagrammatic view showing a state in which adjacent electric wires interfere with each other.
Figure 10B:
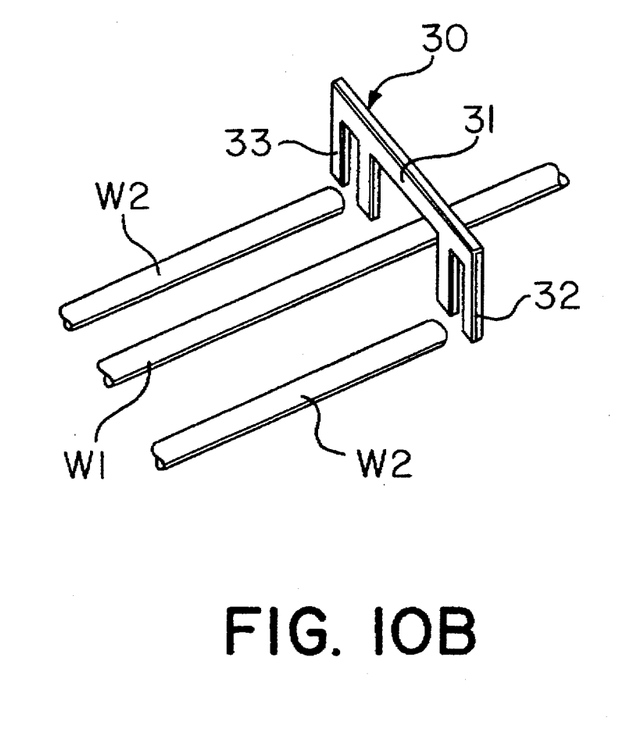
FIG. 10B is an exploded perspective view showing an electric connection casing, according to a fifth embodiment of the present invention, in which an electric wire is cut at an interfered portion to connect its pieces formed by the cutting with each other with a connection terminal.

Referring to FIGS. 10A and 10B, when it is ideal to wire an electric wire W2 at both sides of an electric wire W1 in such a manner that the electric wire W2 crosses over the electric wire W1, the electric wire W2 is cut along a cutting line L and then, the electric wire W1 and the electric wire W2 are connected with each other with a pressure-contact terminal 30.

The pressure-contact terminal 30 comprises a connection portion 31 positioned at the upper end of a conductive metal plate; and two-slot portions 32 and 33 projecting downwardly from both sides of the connection portion 31 and spaced from each other at a certain interval. The width of the slot portion 32 and that of the slot portion 33 correspond to the diameter of the electric wire W2.

The separated electric wires W2 can be connected with the pressure-contact terminal 30 at the slot portions 32 and 33, with the connection portion 31 crossing over the electric wire W1 at the center thereof when the pressure-contact terminal 30 is pressed downward against the electric wires W2.

Figure 11:
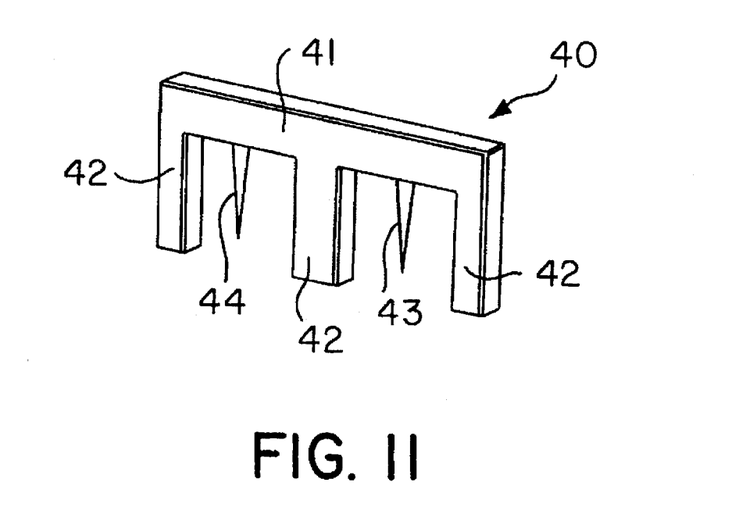
FIG. 11 is a perspective view showing a modification of the connection terminal.

Instead of the contact-pressure terminal shown in FIG. 10B, a contact-pressure terminal 40 shown in FIG. 11 may be used. The contact-pressure terminal 40 comprises a connection portion 41; three wire-holding legs 42 projecting downward from the center of the connection portion 41 and from both sides thereof; and pins 43 and 44 projecting downwardly from the connection portion 41 and positioned between the adjacent wire-holding legs 42. The pins 43 and 44 penetrate through an insulation coating of each electric wire, thus contacting core of the electric wire. As a result, the electric wires and the contact-pressure terminal 40 are connected with each other.

In the construction of the electric connection casing according to the third embodiment, an electric wire is cut at a portion difficult to be wired so as to connect a plurality of separated pieces of the electric wire with the contact-pressure terminal. Accordingly, the electric wire can be wired easily.

If the electric wire cannot be bent at a desired angle, the portion to be bent is cut so as to separate it into a plurality of pieces and connect the separated pieces with the connection terminal 60, 20, 30 or 40. The electric wire formed by the connection between the connection terminal 60, 20, 30 or 40 and the contact-pressure terminal for connecting with external wire can be used as an internal circuit of the electric connection casing.

If the electric wires are wired at a high density and hence interfere with each other, they are cut and the separated pieces are connected with the connection terminal 60, 20, 30 or 40 to wire them easily.

Further, the connection terminal 60, 20, 30 or 40 for connecting electric wires thereto has a simple construction and can be easily composed of a conductive metal plate. Thus, the electric connection casing can be manufactured at a low cost. In addition, operation efficiency can be improved by connecting the contact-pressure terminal provided with an external input/output terminal and an electric wire with each other.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electric connection casing comprising a first intensity-current circuit passing electric current having a first intensity; a second intensity-current circuit passing electric current having a second intensity; and a fuse and a relay interposed between the first intensity-current circuit and the second intensity-current circuit, said first intensity being larger than said second intensity, wherein the first intensity-current circuit and the second intensity-current circuit each comprise a plurality of single core wires; and a plurality of pressure-contact terminals, each penetrating through an insulation coating of one of the single core wires, and thus each being connected with one of the single core wires by pressing each of the pressure-contact terminals against one of the single core wires, and wherein the electric wires comprising the first intensity-current circuit and the second intensity-current circuit are cut into separate pieces at a predetermined location in the electric connection casing, and the pieces are connected with each other by means of the pressure-contact terminals.

2. The electric connection casing according to claim 1, wherein each of the pressure-contact terminals includes a slot portion having a connection edge, to be pressed against the single core wire, said connection edge formed on an inner peripheral surface of the slot; and an input/output terminal to be connected with an external circuit.

3. The electric connection casing according to claim 1, wherein the single core wire of the first intensity-current circuit has a first diameter, and the single core wire of the second intensity-current circuit has a second diameter, said first diameter being larger than said second diameter.

4. The electric connection casing according to claim 1, wherein the first intensity-current circuit comprises a plurality of thin electric wires; the pressure-contact terminal having a plurality of slot portions defined on one side to be pressed against the thin electric wires and an input/output terminal formed on the other side thereof; and the pressure-contact terminal is connected with the thin electric wires by pressing the pressure-contact terminals against the thin electric wires so as to comprise the first intensity-current circuit.

5. An electric connection casing comprising a first intensity-current circuit passing electric current having a first intensity; a second intensity-current circuit passing electric current having a second intensity; and a fuse and a relay interposed between the first intensity-current circuit and the second intensity-current circuit, said first intensity being larger than said second intensity, wherein the first intensity-current circuit and the second intensity-current circuit each comprise a plurality of single core wires; and a plurality of pressure-contact terminals, each penetrating through an insulation coating of one of the single core wires, and thus each being connected with one of the single core wires by pressing each of the pressure-contact terminals against one of the single core wires, and wherein each of the pressure-contact terminals has a plurality of slot portions defined on one side to be pressed against electric wires and an input/output terminal formed on the other side thereof; each of the pressure contact terminals is connected with the electric wires by pressing the pressure-contact terminals against the electric wires; and one end of one of the electric wires is not connected with a pressure-contact terminal, whereby said one electric wire releases heat.

6. An electric connection casing comprising a first intensity-current circuit passing electric current having a first intensity; a second intensity-current circuit passing electric current having a second intensity; and a fuse and a relay interposed between the first intensity-current circuit and the second intensity-current circuit, said first intensity being larger than said second intensity,
wherein the first intensity-current circuit and the second intensity-current circuit each comprise a plurality of single core wires; and a plurality of pressure-contact terminals, each penetrating through an insulation coating of one of the single core wires, and thus each being connected with one of the single core wires by pressing each of the pressure-contact terminals against one of the single core wires, and wherein the electric wires comprising the first intensity current circuit and the second intensity-current circuit are cut into separate pieces at a predetermined and previously determined unbendable location in the electric connection casing, the pieces connected with each other by means of each of the pressure-contact terminals.

7. The electric connection casing according to claim 1, wherein each of the pressure-contact terminals comprises a conductive metal plate; and a plurality of slot portions extends from a connection portion so that the slot portions cut an insulation coating of the electric wire and each of the pressure contact terminals is connected with a single core wire of the electric wire.

8. The electric connection casing according to claim 1, wherein each of the pressure-contact terminals comprises a conductive metal plate; and a plurality of pins extend from a connection portion of each of the pressure contact terminals so that the pins penetrate through an insulation coating of the electric wire and contact a core of the electric wire, the pressure contact terminals thus being connected with a single core wire of the electric wire.

9. The electric connection casing according to claim 6, wherein each of the pressure-contact terminals comprises a conductive metal plate; and a plurality of slot portions extends from a connection portion so that the slot portions cut an insulation coating of the electric wire and each of the pressure contact terminals is connected with a single core wire of the electric wire.

10. The electric connection casing according to claim 6, wherein each of the pressure-contact terminals comprises a conductive metal plate; and a plurality of pins extend from a connection portion of each of the pressure contact terminals so that the pins penetrate through an insulation coating of the electric wire and contact a core of the electric wire, the pressure contact terminals thus being connected with a single core wire of the electric wire.

* * * * *